United States Patent
Suzuki et al.

(10) Patent No.: US 9,297,474 B2
(45) Date of Patent: Mar. 29, 2016

(54) SOLENOID VALVE

(71) Applicant: JTEKT CORPORATION, Osaka-shi, Osaka (JP)

(72) Inventors: Masaru Suzuki, Chiryu (JP); Toshio Murakami, Nagoya (JP); Koichi Takanishi, Nishio (JP); Kaori Fujita, Kariya (JP); Itsuki Ono, Tokai (JP)

(73) Assignee: JTEKT CORPORATION, Osaka-shi (JP)

( * ) Notice: Subject to any disclaimer, the term of this patent is extended or adjusted under 35 U.S.C. 154(b) by 295 days.

(21) Appl. No.: 13/909,481

(22) Filed: Jun. 4, 2013

(65) Prior Publication Data

US 2013/0327968 A1  Dec. 12, 2013

(30) Foreign Application Priority Data

Jun. 7, 2012  (JP) ................. 2012-129899
Oct. 5, 2012  (JP) ................. 2012-222723

(51) Int. Cl.
*F16K 31/06* (2006.01)
*F16K 27/04* (2006.01)

(52) U.S. Cl.
CPC .......... *F16K 31/0675* (2013.01); *F16K 27/048* (2013.01); *F16K 31/0613* (2013.01)

(58) Field of Classification Search
CPC . F16K 27/041; F16K 27/048; F16K 31/0613; F16K 31/0689; F16K 31/0693; F16K 31/0696; F15B 13/0402; F15B 13/0403; Y10T 137/86622; Y10T 137/87217; Y10T 137/86614
See application file for complete search history.

(56) References Cited

U.S. PATENT DOCUMENTS

| | | | | |
|---|---|---|---|---|
| 4,643,225 A * | 2/1987 | Imhof | ...................... | 137/596.17 |
| 4,941,321 A * | 7/1990 | Brunner | .......................... | 60/468 |
| 5,191,827 A * | 3/1993 | Kervagoret | ..................... | 91/433 |
| 5,230,364 A * | 7/1993 | Leng et al. | ..................... | 137/514 |
| 5,571,248 A * | 11/1996 | Seetharaman et al. | ... | 137/625.65 |
| 5,853,028 A * | 12/1998 | Ness | .................. | G05D 16/2013 137/625.65 |
| 6,948,514 B1 * | 9/2005 | Kramer et al. | ............. | 137/15.21 |
| 2006/0081298 A1 | 4/2006 | Segi et al. | | |

FOREIGN PATENT DOCUMENTS

JP   A-2006-112514   4/2006

* cited by examiner

*Primary Examiner* — Matthew W Jellett
(74) *Attorney, Agent, or Firm* — Oliff PLC

(57) ABSTRACT

A solenoid valve includes: a sleeve having a supply port and an output port; a spool valve that is housed in a valve hole formed in the sleeve so as to be movable in the axial direction, and that changes a flow passage area between the supply port and the output port by moving in the axial direction; a solenoid portion that pushes the spool valve toward one axial side; and a coil spring that urges the spool valve toward the solenoid portion. A housing hole that is a bottomed hole is formed in the spool valve, and a columnar piston member is slidably housed in the housing hole. The spool valve has an introduction hole through which a pressure of the hydraulic fluid output from the output port is introduced into a space between a bottom face of the housing hole and one end face of the piston member.

15 Claims, 5 Drawing Sheets

The embodiment of the invention

The embodiment of the invention

The embodiment of the invention

The embodiment of the invention

The comparative example

The comparative example

The first alternative embodiment

The first alternative embodiment

The second alternative embodiment

The second alternative embodiment

SOLENOID VALVE

INCORPORATION BY REFERENCE

The disclosure of Japanese Patent Applications No. 2012-129899, filed on Jun. 7, 2012, and No. 2012-222723, filed on Oct. 5, 2012, each including the specification, drawings and abstract, is incorporated herein by reference in its entirety.

BACKGROUND OF THE INVENTION

1. Field of the Invention

The invention relates to a solenoid valve that outputs hydraulic fluid on the basis of an exciting current supplied to a coil.

2. Description of Related Art

There is a conventional solenoid valve that includes a shaft-shaped spool valve housed in a tubular sleeve so as to be movable in its axial direction, and that is configured such that a flow passage of hydraulic fluid and a flow passage area are changed by moving the spool valve in the axial direction (see, for example, Japanese Patent Application Publication No. 2006-112514, (JP 2006-112514, A)).

The solenoid valve described in JP 2006-112514, A includes a solenoid portion, a spool valve, and a spring. The solenoid portion moves a plunger using a magnetic force of an electromagnetic coil. The spool valve is pushed in response to an operation of the solenoid portion and moves within a valve hole of the sleeve. The spring urges the spool valve toward the solenoid portion.

In recent years, reduction in size and weight of this kind of solenoid valve has been demanded. For example, if this kind of solenoid valve is applied to a hydraulic control apparatus in an automatic transmission of a vehicle, a plurality of solenoid valves need to be arranged in an engine room. Accordingly, if each solenoid valve is large, it may be difficult to arrange the solenoid valves because the solenoid valves may contact other accessories. Further, if each solenoid valve is heavy, an improvement in the fuel efficiency of the vehicle may be hindered.

SUMMARY OF THE INVENTION

One object of the invention is to provide a smaller and lighter solenoid valve.

An aspect of the invention relates to a solenoid valve, including: a tubular sleeve that has a supply port to which hydraulic fluid is supplied and an output port that outputs the hydraulic fluid; a spool valve that is housed in a valve hole formed in the sleeve so as to be movable in an axial direction of the solenoid valve, and that changes a flow passage area between the supply port and the output port by moving in the axial direction; a solenoid portion that operates upon reception of a supply of exciting current to push the spool valve toward one axial side; and an elastic member that urges the spool valve toward the solenoid portion. A housing portion that is a bottomed hole is formed in an end portion of the spool valve so as to extend along a central axis of the spool valve, the end portion being on an opposite side of the spool valve from the solenoid portion, and a columnar piston member is slidably housed in the housing portion. The spool valve has an introduction hole through which a pressure of the hydraulic fluid output from the output port is introduced into a space between a bottom face of the housing portion and one end face of the piston member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1A and FIG. 1B illustrate an example of the configuration of a solenoid valve according to an embodiment of the invention, wherein FIG. 1A is a sectional view thereof, and FIG. 1B is an external view thereof;

FIG. 3A and FIG. 3B illustrate an example of the configuration of a solenoid valve according to a comparative example, wherein FIG. 3A is a sectional view thereof, and FIG. 3B is an external view thereof;

FIG. 4A and FIG. 4B illustrate a piston member according to a first alternative embodiment, wherein FIG. 4A is an external view, and FIG. 4B is a sectional view of the piston member taken along the central axis thereof; and FIG. 5A and FIG. 5B illustrate a piston member according to a second alternative embodiment, wherein FIG. 5A is an external view thereof, and FIG. 5B is a sectional view of the piston member taken along the central axis thereof.

DETAILED DESCRIPTION OF EMBODIMENTS

An embodiment of the invention will be described below with reference to FIGS. 1A, 1B and FIGS. 2A, 2B.

Figure 1A:
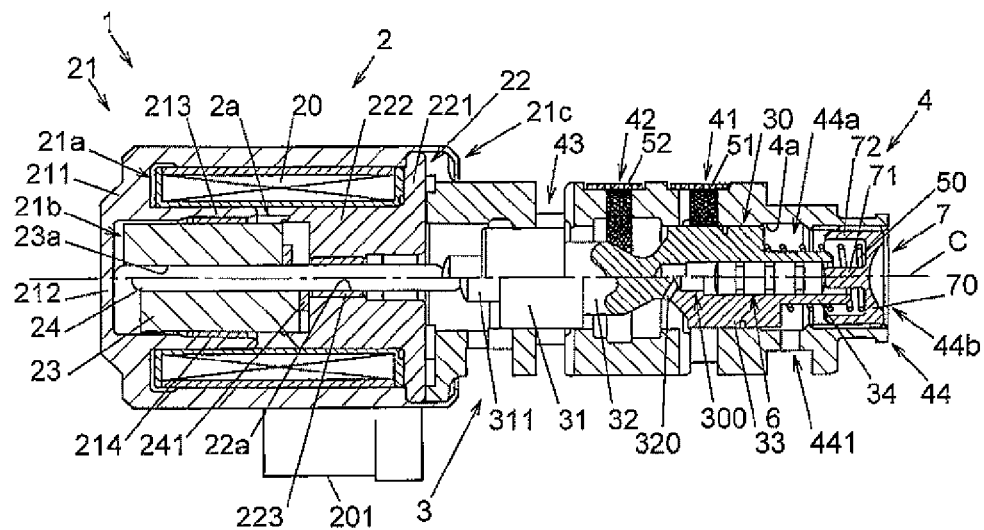
Figure 1B:
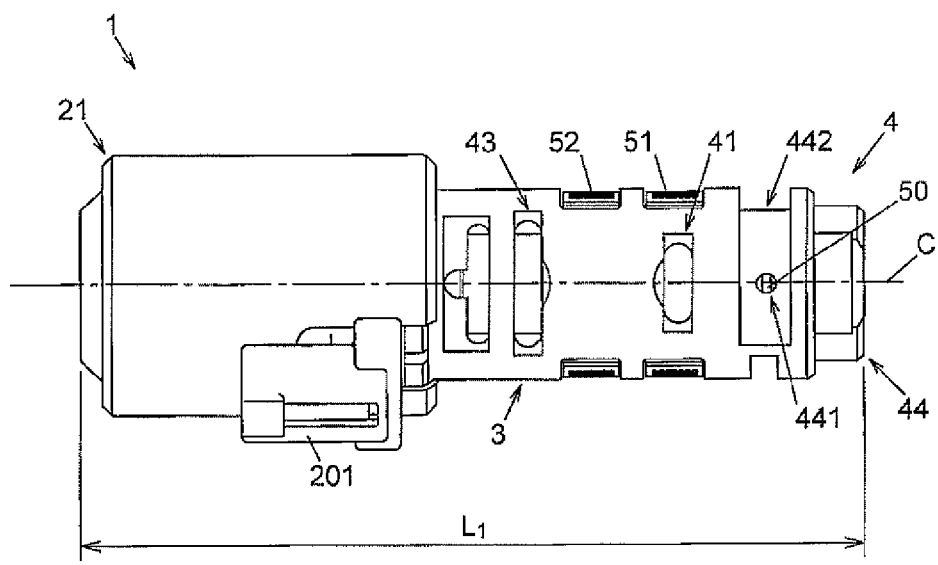

FIGS. 1A, 1B illustrate an example of the configuration of a solenoid valve according to the present embodiment. FIG. 1A is a sectional view of the solenoid valve, and FIG. 1B is an external view thereof. An operating state is illustrated in the upper half of FIG. 1A, and a non-operating state is illustrated in the lower half of FIG. 1A.

The solenoid valve 1 is provided in, for example, a vehicle. The solenoid valve 1 is provided in a supply passage through which fluid pressure is supplied to an actuator that assists a shift operation with the use of the fluid pressure during shifting of an electronically-controlled automatic transmission. The solenoid valve 1 is used in this state.

The solenoid valve 1 includes a solenoid portion 2 and a spool control valve 3. The solenoid portion 2 is actuated upon reception of a supply of exciting current. The spool control valve 3 is connected to the solenoid portion 2.

The solenoid portion 2 includes an electromagnetic coil 20, a tubular cover member 21, a core member 22, and a plunger 23. The cover member 21 is made of a magnetic material. The core member 22 is also made of a magnetic material. The plunger 23 moves with respect to the cover member 21 and the core member 22 in the axial direction.

The electromagnetic coil 20 is housed in an annular housing space 21a formed in the cover member 21. The electromagnetic coil 20 generates a magnetic field upon reception of a supply of exciting current from a connector portion 201 fixed to the outer periphery of the cover member 21. The electromagnetic coil 20 is housed in the housing space 21a, such that one axial end thereof faces, in the housing space 21a, a bottom 211 of the cover member 21 and the other end thereof faces the core member 22.

The cover member 21 has a cylindrical cylinder portion 21b, that houses the plunger 23, and that is located radially inward of the housing space 21a, that houses the electromagnetic coil 20. The cylinder portion 21b, is formed of a bottom 212 and a cylindrical projecting portion 213. The projecting portion 213 projects from the bottom 212 toward the core member 22. A bearing bush 214 that guides an axial movement of the plunger 23 is arranged radially inward of the projecting portion 213.

The core member 22 is a single-piece member having a flange portion 221 and a cylindrical projecting portion 222. The flange portion 221 faces the electromagnetic coil 20 in the axial direction. The projecting portion 222 projects from the flange portion 221 toward the bottom 212 and the projecting portion 213 of the cover member 21. An axial through-hole 22a, is formed in the core member 22 so as to extend in the axial direction, and a bearing bush 223 is arranged in the through-hole 22a. A clearance 2a, is formed between the distal end of the projecting portion 222 of the core member 22 and the distal end of the projecting portion 213 of the cover member 21.

The plunger 23 is axially movable in the cylinder portion 21b,, and a through-hole 23a, is formed in its center portion. The base end portion of a shaft-shaped rod 24 is fixed in the through-hole 23a. A stopper body 241 that restricts movement of the plunger 23 toward the core member 22 is fixed to the outer periphery of the rod 24.

The rod 24 is guided by the bearing bush 223 so as to pass through the through-hole 22a, formed in the core member 22, and the distal end thereof sticks out from the flange portion 221 of the core member 22. The distal end of the rod 24 that sticks out from the core member 22 contacts one end of a spool valve 30 (described below) of the spool control valve 3, and pushes the spool valve 30 toward one axial side along a central axis C of the spool valve 30.

The spool control valve 3 includes a shaft-shaped spool valve 30 and a tubular sleeve 4. The sleeve 4 has a valve hole 4a, in which the spool valve 30 is housed so as to be movable in the axial direction. One end of the sleeve 4 is swaged and fixed to a swaged portion 21c, of the cover member 21 together with the flange portion 221 of the core member 22.

The spool valve 30 is made of an aluminum alloy containing aluminum (Al) as the main ingredient, and further containing metal such as copper (Cu), manganese (Mn), silicon (Si), magnesium (Mg), or zinc (Zn) to increase its strength. The spool valve 30 is a single-piece member having a first land portion 31, a small-diameter portion 32 having a diameter smaller than that of the first land portion 31, a second land portion 33, and a tubular protruding portion 34, which are arranged in this order from the solenoid portion 2 side. The spool valve 30 is elastically urged toward the solenoid portion 2 by a coil spring 50 that serves as an elastic member that contacts a step portion between the second land portion 33 and the tubular protruding portion 34. The first land portion 31 has a protrusion 311 that protrudes toward the solenoid portion 2, and the distal end of the protrusion 311 contacts the distal end of the rod 24. When the solenoid portion 2 is in the non-operating state, the base end of the rod 24 contacts the bottom 212 of the cover member 21, as illustrated in upper half of FIG. 1A.

Further, a bottomed housing hole 300 that extends along the central axis C is formed in an end portion of the spool valve 30, which is on the opposite side of the spool valve 30 from the solenoid portion 2. The housing hole 300 is one example of a housing portion according to the invention, which houses a piston member 6, and has an inner diameter of 2 to 5 mm, for example. The housing hole 300 is formed to extend from the end portion of the spool valve 30 toward the solenoid portion 2. A columnar piston member 6 is slidably housed in the housing hole 300. The axial length of the piston member 6 is at least twice as large as the diameter thereof, and is set to be shorter than the depth of the housing hole 300. The piston member 6 is made of, for example, an aluminum alloy similar to the aluminum alloy used to form the spool valve 30. The housing hole 300 communicates with a space on the outside of the outer periphery of the small-diameter portion 32 via an introduction hole 320. Details of the housing hole 300 and its surrounding area will be described later.

The sleeve 4 has a supply port 41, an output port 42, a drain port 43, and a tubular portion 44. Hydraulic fluid discharged from a discharge port of an oil pump (not shown) is supplied to the supply port 41. The output port 42 communicates with the supply port 41 when the solenoid portion 2 is in the operating state, and outputs the hydraulic fluid to a controlled object (e.g., a clutch of an electronically-controlled automatic transmission). The drain port 43 communicates with the output port 42 when the solenoid portion 2 in the non-operating state, and drains the hydraulic fluid. The tubular portion 44 has a spring chamber 44a, that houses the coil spring 50.

A first strainer 51 that restricts entry of foreign matter into the valve hole 4a, of the sleeve 4 is mounted on the supply port 41. A second strainer 52 that restricts discharge of foreign matter is mounted on the output port 42. The hydraulic fluid drained from the drain port 43 is introduced into a drain tank (not shown).

The state of communication among the supply port 41, the output port 42, and the drain port 43 is switched by the axial movement of the spool valve 30. That is, when the solenoid portion 2 is in the non-operating state as illustrated in the upper half of FIG. 1A, communication between the supply port 41 and the output port 42 is blocked by the second land portion 33 of the spool valve 30, while the output port 42 and the drain port 43 are communicated with each other via a space around the outer periphery of the small-diameter portion 32 of the spool valve 30. On the other hand, when the solenoid portion 2 is in the operating state as illustrated in the bottom half of FIG. 1A, the supply port 41 and the output port 42 are communicated with each other via a space around the outer periphery of the small-diameter portion 32, while communication between the output port 42 and the drain port 43 is blocked by the first land portion 31 of the spool valve 30.

A restriction hole 441 that communicates with the spring chamber 44a, is formed in the tubular portion 44. The restriction hole 441 communicates with an annular groove 442 (illustrated in FIG. 1B) formed on the outer periphery of the sleeve 4. The tubular portion 44 is provided at the other end of the sleeve 4, which is on the opposite side of the sleeve 4 from the solenoid portion 2, and an opening 44b, of the sleeve 4 is closed by a plug 7 having a bottomed tubular shape.

The plug 7 is a single-piece member having a disk-shaped bottom 70, a protrusion 71, and a cylindrical portion 72. One end of the coil spring 50 contacts the bottom 70. The protrusion 71 is arranged at the center portion of the bottom 70, and protrudes toward the spool valve 30. The cylindrical portion 72 is formed along the peripheral edge of the bottom 70, and is screwed to the inner periphery of the tubular portion 44 of the sleeve 4.

Figure 2A:
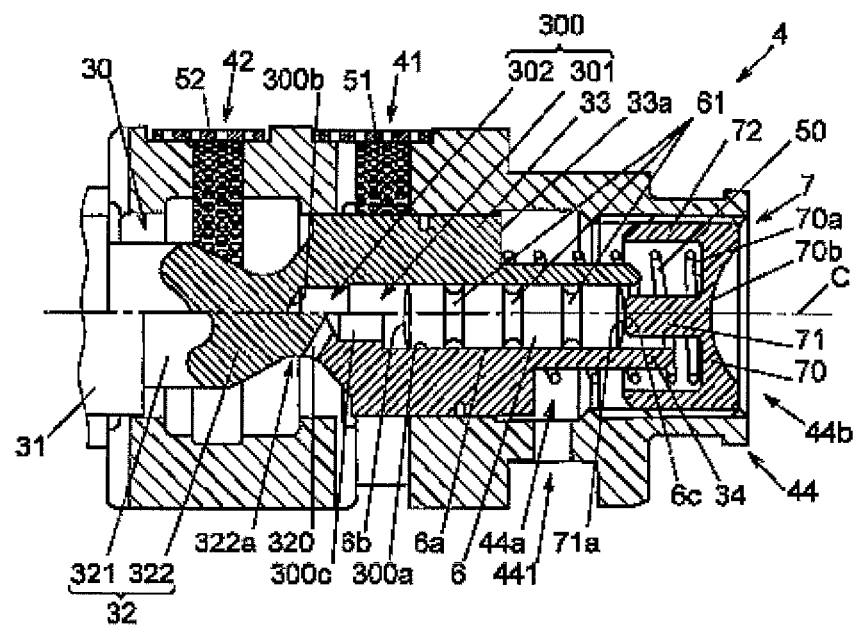
FIG. 2A is an enlarged view of a housing hole of a spool valve and its surrounding area in FIG. 1A.
Figure 2B:
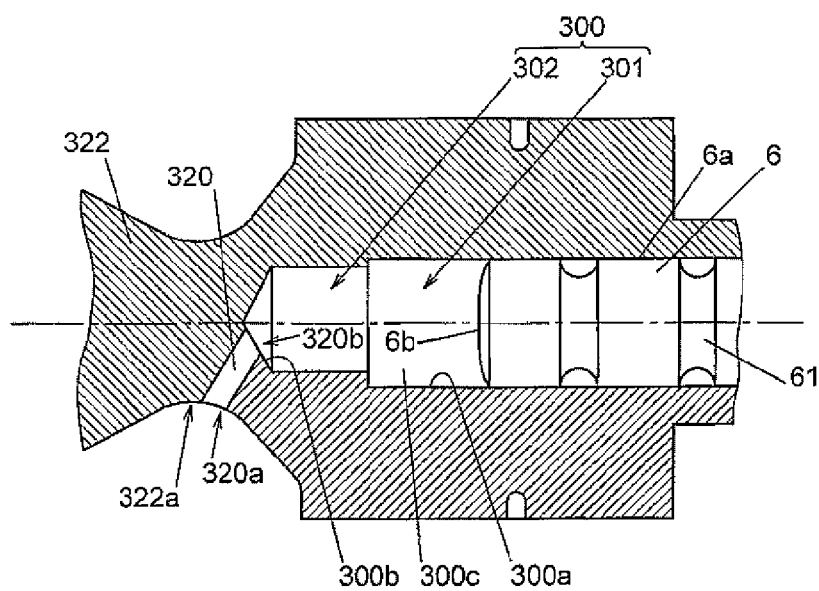
FIG. 2B is a further-enlarged view illustrating a portion near the bottom of the housing hole in FIG. 2A.

FIG. 2A is an enlarged view of the housing hole 300 of the spool valve 30 and its surrounding area in FIG. 1A. FIG. 2B is a further-enlarged view illustrating a portion near the bottom of the housing hole 300 in FIG. 2A.

The housing hole 300 is formed of a large-diameter portion 301 and a small-diameter portion 302. The small-diameter portion 302 is at a position deeper than the large-diameter portion 301 (i.e., the small-diameter portion 302 is closer to a bottom face 300b, than the large-diameter portion 301). An example a method of forming the housing hole 300 is as follows. A drill is inserted into the spool valve 30 from its end portion along the central axis C to form a hole having a diameter equal to that of the small-diameter portion 302.

Then, the inner diameter of an opening side portion of the hole is increased by a tool such as a reamer to form the large-diameter portion 301. In this case, a bottom face 300b, of the housing hole 300 is formed into a shape corresponding to the shape of a tip portion of the drill. That is, as illustrated in FIG. 2B, the bottom face 300b, is formed into a tapered shape so that the depth of the bottom face 300b, in the direction of the central axis C becomes gradually larger toward the center of the bottom face 300b.

As illustrated in FIG. 2B, the introduction hole 320 has, at one end thereof, an opening 320a, that opens on the outer peripheral face of the small-diameter portion 32 of the spool valve 30, and has, at the other end thereof, an opening 320b, that opens on the bottom face 300b, of the housing hole 300. The small-diameter portion 32 has a cylindrical portion 321 located on the first land portion 31 side, and a constricted (narrow) portion 322 which is formed on the second land portion 33 side and of which the diameter becomes small at its axially center portion. The opening 320a, is formed at a position closer to second land portion 33 than a smallest-diameter portion 322a, at which the diameter of the constricted portion 322 is smallest.

The introduction hole 320 is formed by inserting a drill into the spool valve 30 along a direction oblique to the radial direction, which is perpendicular to the central axis C, from the opening 320a, toward the opening 320b. Because the opening 320b, is formed in the bottom face 300b, of the housing hole 300, it is possible to see the opening 320b, from an opening of the housing hole 300 after drilling. This makes it possible to easily check whether there is a burr at the opening 320b.

Further, because the bottom face 300b, has a tapered shape, the angle of the introduction hole 320 with respect to the bottom face 300b, is closer to the right angle than that in a case where the bottom face 300b, is a flat face. Accordingly, imbalance of load placed on the drill hardly occurs during formation of the introduction hole 320, which makes it easier to form the introduction hole 320. That is, it becomes easier to form the introduction hole 320 that reliably leads to the bottom face 300b,, from the outer peripheral side of the spool valve 30.

Electroless plating is performed on an area of the spool valve 30, which includes an inner peripheral face 300a, that defines the housing hole 300, so as to increase its surface hardness. Specifically, as the electroless plating, electroless nickel plating (NiP plating) may be employed. By performing electroless nickel plating on the spool valve 30 made of an aluminum alloy, it is possible to increase a surface hardness Hv thereof from 100, (when plating is not performed) to approximately 500, (when electroless nickel plating is performed), for example. By performing such electroless plating on the spool valve 30, abrasion resistance at the inner peripheral face 300a, improves, resistance to foreign matter improves, and appropriate sliding performance is maintained even after long-term use.

An anodic oxide coating is performed on a spool valve of a conventional solenoid valve having no housing hole 300 to increase the surface hardness. However, air bubbles are generated during the anodic oxide coating. Therefore, if the anodic oxide coating is performed on the spool valve 30 according to the present embodiment, air bubbles accumulate in the housing hole 300, which makes it difficult to form an anodized layer appropriately on the inner peripheral face 300a. In view of this, in the present embodiment, electroless plating that does not cause air bubbles is performed instead of the anodic oxide coating. This makes it possible to form a plating film without accumulation of air bubbles in the housing hole 300 of the spool valve 30. As a result, it is possible to increase the surface hardness of the inner peripheral face 300a, and to improve resistance to foreign matter and abrasion resistance.

Further, electroless plating similar to that performed on the spool valve 30 may be performed on the piston member 6. Note that, the surface treatment performed on the piston member 6 may be an anodic oxide coating. By performing the electroless plating or the anodic oxide coating on the piston member 6 to increase surface hardness of an outer peripheral face 6a, the piston member 6, it is possible to further increase the resistance to foreign matter, the abrasion resistance, and the sliding performance.

The piston member 6 is housed in the large-diameter portion 301 of the housing hole 300, and the outer peripheral face 6a, thereof is slidable with a portion of the inner peripheral face 300a,, which defines the large-diameter portion 301 of the housing hole 300. Multiple annular grooves 61 (three annular grooves in an example illustrated in FIG. 2A), serving as recesses, in which foreign matter mixed in the hydraulic fluid is retained, are formed in the outer peripheral face 6a, of the piston member 6. Each of the annular grooves 61 extends in the circumferential direction of the piston member 6, and is formed in the piston member 6 along its whole circumference.

Because the annular grooves 61 are formed in the piston member 6, foreign matter such as minute iron powder mixed in the hydraulic fluid are taken into the annular grooves 61, which improves resistance to foreign matter. That is, it is possible to reduce occurrence of a problem that the sliding performance of the piston member 6 is impaired, i.e., the piston member 6 does not slide smoothly within the housing hole 300 due to foreign matter caught between the inner peripheral face 300a, that defines the housing hole 300 and the outer peripheral face 6a, of the piston member 6. Furthermore, it is also possible to reduce occurrence of a problem that the inner peripheral face 300a that defines the housing hole 300 or the outer peripheral face 6a, of the piston member 6 is damaged by foreign matter and the flow rate of the leaking hydraulic fluid increases due to the damage. Further, the central axis of the piston member 6 easily coincides with the central axis of the housing hole 300 by a pressure of the hydraulic fluid in the annular grooves 61.

A pressure of the hydraulic fluid supplied to the supply port 41 is introduced into a space 300c, between one axial end face 6b, of the piston member 6 and the bottom face 300b, of the housing hole 300, via the introduction hole 320 during an operation of the solenoid portion 2. That is, when the solenoid portion 2 operates and the spool valve 30 moves toward the plug 7 to provide communication between the supply port 41 and the output port 42 via the space around the outer periphery of the small-diameter portion 32, a pressure of the hydraulic fluid at the opening 320a, of the introduction hole 320 serves as a pressure of the hydraulic fluid that is output from the output port 42. This pressure is introduced into the space 300c, via the introduction hole 320.

The pressure introduced into the space 300c, acts on the bottom face 300b of the housing hole 300, and then serves as a feedback pressure with which the spool valve 30 is pushed toward the solenoid portion 2. This makes it possible to suppress an influence of variations in a pressure discharged from an oil pump, on a pressure of the hydraulic fluid output from the output port 42. Thus, it is possible to control a hydraulic pressure output from the output port 42 with high accuracy, using an exciting current supplied to the electromagnetic coil 20.

Further, the pressure introduced into the space 300c, acts on the one end face 6b, of the piston member 6, thereby pushing the piston member 6 toward the protrusion 71 of the plug 7.

A distal end face 71a, of the protrusion 71 of the plug 7 faces the other axial end face 6c, (an end face of the piston member 6, which is on the opposite side of the piston member 6 from the one end face 6b) of the piston member 6. The protrusion 71 has a columnar shape, and its external diameter is smaller than the inner diameter of the housing hole 300. The distal end face 71a, of the protrusion 71 is located within the housing hole 300 even when the solenoid portion 2 is in the non-operating state. That is, the distal end face 71a, of the protrusion 71 is located within the housing hole 300 regardless of whether the solenoid portion 2 is in the non-operating state or in the operating state.

In other words, the distal end portion of the protrusion 71 including the distal end face 71a, is always located inside the housing hole 300, and even if the spool valve 30 moves in the axial direction, the distal end face 71a, and the other end face 6c, of the piston member 6 do not come out of the housing hole 300. Therefore, the distal end of the tubular protruding portion 34 does not contact the outer peripheral face 6a, of the piston member 6, and the piston member 6 slides smoothly with respect to the spool valve 30.

The other end face 6c, of the piston member 6 is a convexly curved face that bulges toward the protrusion 71, and the distal end face 71a, of the protrusion 71 is a flat face that is perpendicular to the central axis thereof. Thus, the piston member 6 and the protrusion 71 easily move relative to each other in the radial direction. Accordingly, even if the central axis of the protrusion 71 is offset from the central axis C of the spool valve 30, the spool valve 30 does not become eccentric with respect to the valve hole 4a of the sleeve 4. This restricts leakage of the hydraulic fluid.

At the bottom 70 of the plug 7, the one end of the coil spring 50 contacts a portion of an inner face 70a, that faces the spool valve 30, the portion being located around the base end portion of the protrusion 71. An outer face 70b, of the bottom 70 is formed in a shape of a concavely curved face. The other end of the coil spring 50 contacts a step face 33a, between the second land portion 33 and the tubular protruding portion 34.

In the solenoid valve 1 configured as described above, when an exciting current is supplied to the electromagnetic coil 20, the plunger 23 moves toward the core member 22 by the magnetic force. The rod 24 pushes the spool valve 30, so that the spool valve 30 axially moves in the valve hole 4a, along the central axis C. When the spool valve 30 moves in the axial direction, the supply port 41 and the output port 42 are communicated with each other via the small-diameter portion 32. Thus, the hydraulic fluid is output from the output port 42 to a controlled object. Further, a pressure of the hydraulic fluid supplied to the supply port 41 is introduced into the space 300c, of the housing hole 300 via the introduction hole 320, thereby generating a feedback pressure for pushing the spool valve 30 toward the solenoid portion 2.

The spool valve 30 changes a flow passage area between the supply port 41 and the output port 42 and a flow passage area between the output port 42 and the drain port 43 by moving in the axial direction. The spool valve 30 is located at such a position that the magnetic force of the electromagnetic coil 20, the urging force of the coil spring 50, and the feedback pressure are balanced with each other.

Figure 3A:
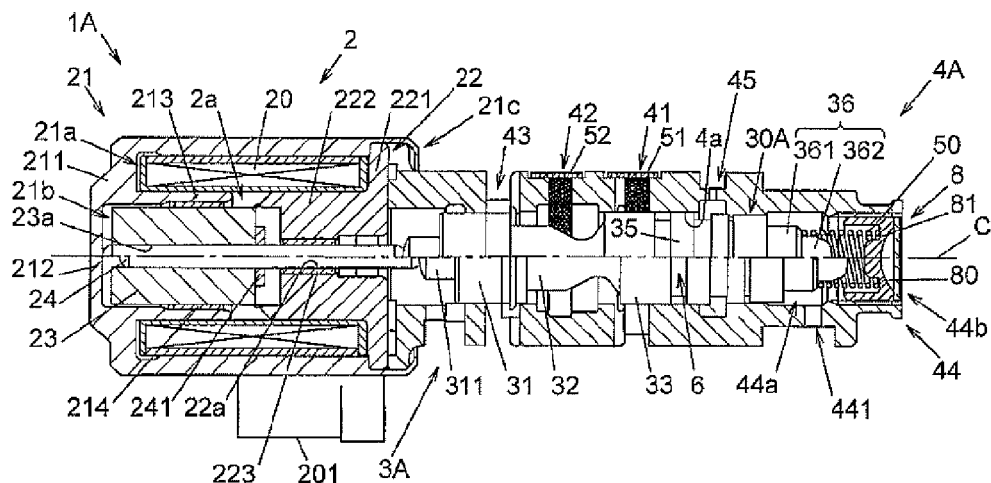
Figure 3B:
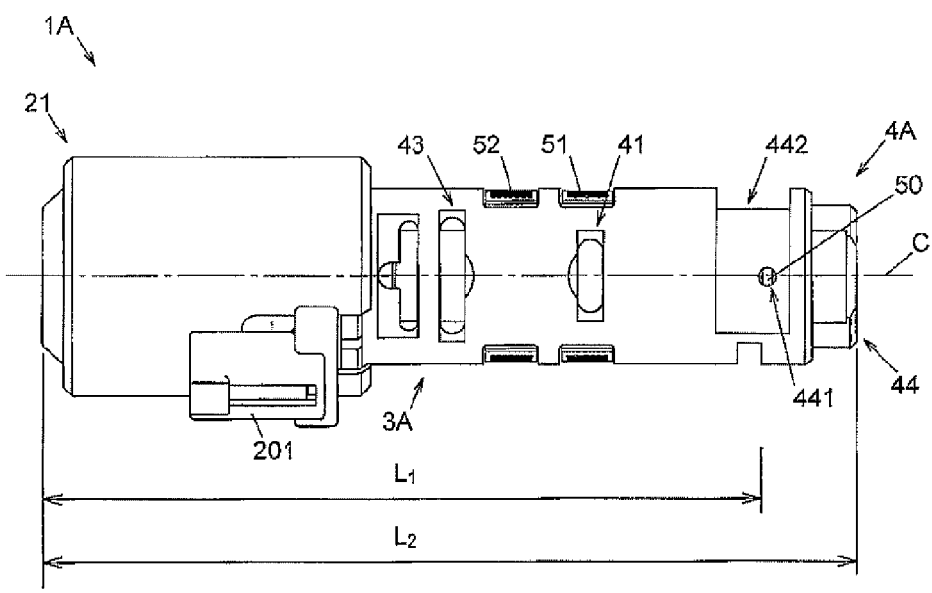

FIGS. 3A, 3B illustrate an example of the configuration of a solenoid valve 1A in a comparative example. FIG. 3A is a sectional view of the solenoid valve 1A, and FIG. 3B is an external view thereof. In FIG. 3A and FIG. 3B, components having functions substantially the same as those of the components described with reference to FIGS. 1A, 1B will be denoted by the same reference numerals as those in FIGS. 1A, 1B, and redundant description thereof will be omitted.

In the solenoid valve 1A, the configurations of a spool valve 30A of a spool control valve 3A and a sleeve 4A are different from the configurations of the spool valve 30 and the sleeve 4 of the solenoid valve 1 according to the above-described embodiment. Note that the following description will be provided on the assumption that the pressure and the flow rate of hydraulic fluid in the solenoid valve 1A are the same as those in the solenoid valve 1.

The spool valve 30A has a third land portion 35 and a boss portion 36 instead of the tubular protruding portion 34 and the housing hole 300. The sleeve 4A has a feedback port 45 that communicates with the output port 42 via a valve body (not shown). Further, an opening of the sleeve 4A is closed by a plug 8.

The third land portion 35 is located closer to the second land portion 33 than the feedback port 45. Upon reception of a pressure of hydraulic fluid supplied to the feedback port 45, the spool valve 30A is pushed toward the solenoid portion 2.

The boss portion 36 is formed of a columnar base portion 361 and a protruding portion 362. The protruding portion 362 protrudes from the base portion 361 toward the plug 8, and has a diameter smaller than that of the base portion 361. One end of the coil spring 50 contacts a step face between the base portion 361 and the protruding portion 362.

The plug 8 is a single-piece member having a disk-shaped bottom 80, a protrusion 81, and a cylindrical portion 82. One end of the coil spring 50 contacts the bottom 80. The protrusion 81 is arranged at the center portion of the bottom 80, and protrudes toward the spool valve 30A. The cylindrical portion 82 is formed along the peripheral edge of the bottom 80, and is screwed to the inner periphery of the tubular portion 44 of the sleeve 4A. The height (axial length) of the protrusion 81 is smaller than the height of the protrusion 71 of the plug 7 of the solenoid valve 1 according to the above-described embodiment. The protrusion 81 is configured so as not to contact the protruding portion 362 of the boss portion 36.

When the axial dimension of the solenoid valve 1 is L1 and the axial dimension of the solenoid valve 1A is L2, , L1 , is shorter than L2, by 10% or more. The reduction of the axial dimension is achieved by employing the configuration in which the housing hole 300 is formed in the spool valve 30 and the piston member 6 is slidably housed in the housing hole 300.

That is, a pressure of the hydraulic fluid supplied to the supply port 41 is introduced into the space 300c, of the housing hole 300 via the introduction hole 320, thereby generating a feedback pressure. With this configuration, the third land portion 35 and the feedback port 45 of the solenoid valve 1A are no longer necessary. Further, the coil spring 50 is brought into contact with the step face 33a, between the second land portion 33 and the tubular protruding portion 34, thereby causing the housing hole 300 and the coil spring 50 to overlap with each other in the radial direction that is perpendicular to the central axis C. This makes it possible to reduce a space only for housing the coil spring 50. Accordingly, the axial dimension of the solenoid valve 1 is made smaller than the axial dimension of the solenoid valve 1A. Further, this reduction of the axial dimension makes the weight of the solenoid valve 1 less than the weight of the solenoid valve 1A.

According to the above-described embodiment, it is possible to reduce the axial length of the solenoid valve 1. This contributes to weight reduction of the solenoid valve 1.

One example embodiment of the invention has been described as above. However, the invention is not limited to the above-described embodiment, and various modifications may be made without departing from the scope of the invention. For example, the shape of the piston member 6 may be modified as illustrated in FIGS. 4A, 4B and FIGS. 5A, 5B.

Figure 4A:
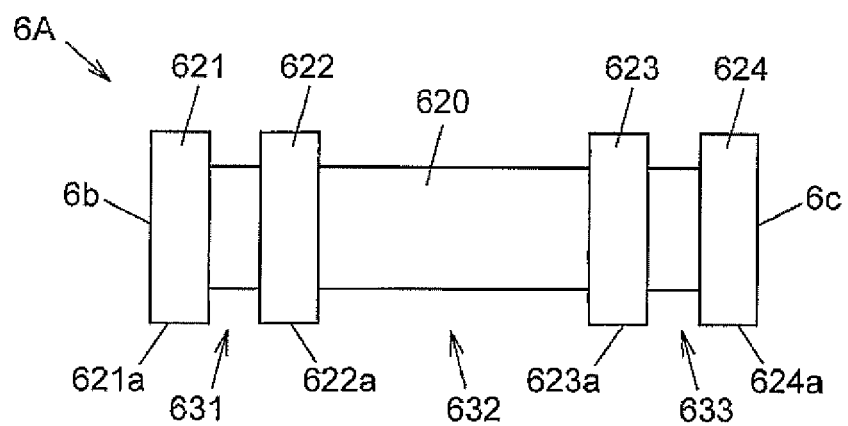
Figure 4B:
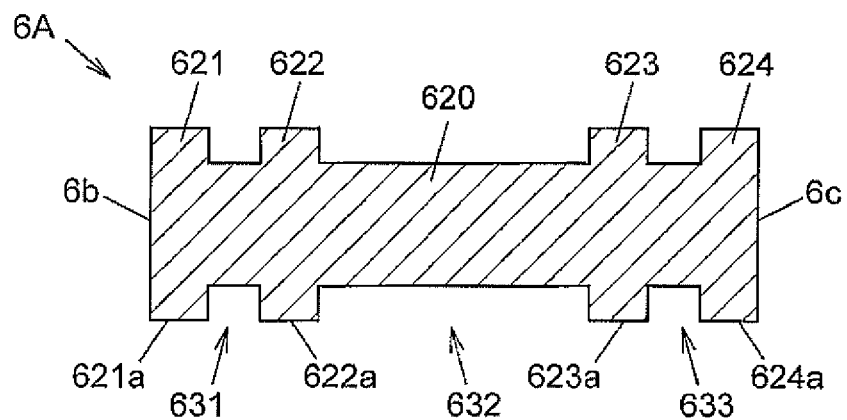

FIGS. 4A, 4B illustrate a piston member 6A according to a first alternative embodiment. FIG. 4A is an external view of the piston member 6A, and FIG. 4B is a sectional view of the piston member 6A taken along its central axis. The piston member 6A is a single-piece member having a columnar shaft portion 620 and four annular protrusions (first to fourth annular protrusions 621 to 624) arranged on the outer periphery of the shaft portion 620. The first to fourth annular protrusions 621 to 624 are arranged at irregular intervals from one end 6b, to the other end 6c. A first annular groove 631 is formed between the first annular protrusion 621 and the second annular protrusion 622. A second annular groove 632 is formed between the second annular protrusion 622 and the third annular protrusion 623. A third annular groove 633 is formed between the third annular protrusion 623 and the fourth annular protrusion 624. In the example illustrated in FIGS. 4A, 4B, the first annular groove 631 and the third annular groove 633 has the same groove width. The groove width of the second annular groove 632 is larger than the groove width of the first and third annular grooves 631, 633. Outer peripheral faces 621a,, 622a,, 623a,, 624a, of the first to fourth annular protrusions 621 to 624 are in sliding contact with the inner peripheral face 300a, of the spool valve 30, which defines the housing hole 300. With this alternative embodiment as well, foreign matter such as minute iron powders mixed in the hydraulic fluid are taken into the first to third annular grooves 631 to 633, thereby improving resistance to foreign matter.

Figure 5A:
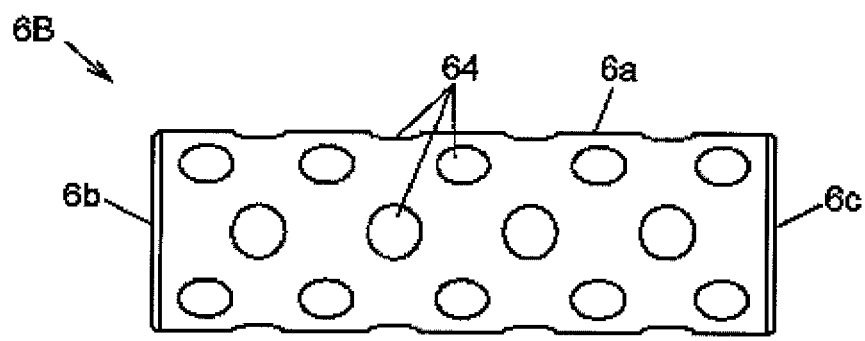
Figure 5B:
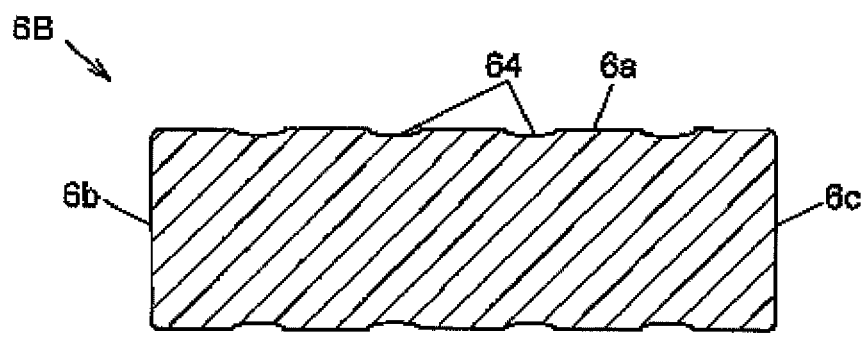

FIGS. 5A, 5B illustrate a piston member 6B according to a second alternative embodiment. FIG. 5A is an external view of the piston member 6B, and FIG. 5B is a sectional view of the piston member 6B along its central axis. In the piston member 6B, multiple dimples 64 are formed in an outer peripheral face 6a, thereof. In the example illustrated in FIGS. 5A, 5B, the dimples 64 are formed with the substantially uniform density from one end 6b, to the other end 6c. However, the dimples 64 may be formed non-uniformly, that is, may be concentrated at the one end 6b, side or the other end 6c, side. With this alternative embodiment as well, foreign matter such as minute iron powders mixed in the hydraulic fluid are taken into the multiple dimples 64, thereby improving resistance to foreign matter.

According to the invention, it is possible to reduce the axial length of a solenoid valve.

What is claimed is:

1. A solenoid valve, comprising:
   a tubular sleeve that has a supply port to which hydraulic fluid is supplied and an output port that outputs the hydraulic fluid;
   a spool valve that is housed in a valve hole formed in the sleeve so as to be movable in an axial direction of the solenoid valve, and that changes a flow passage area between the supply port and the output port by moving in the axial direction;
   a solenoid portion that operates upon reception of a supply of exciting current to push the spool valve toward one axial side; and
   an elastic member that urges the spool valve toward the solenoid portion, wherein
   a housing portion that is a bottomed hole is formed in an end portion of the spool valve so as to extend along a central axis of the spool valve, the end portion being on an opposite side of the spool valve from the solenoid portion, and a columnar piston member is slidably housed in the housing portion,
   the spool valve has an introduction hole through which a pressure of the hydraulic fluid output from the output port is introduced into a space between a bottom face of the housing portion and one end face of the piston member,
   an opening in an end portion of the sleeve, the end portion being on an opposite side of the sleeve from the solenoid portion, is closed by a plug,
   the plug has a protrusion that protrudes toward the spool valve and that is formed at a center portion of the plug, and a distal end face of the protrusion faces the other end face of the piston member, and
   the distal end face of the protrusion of the plug is located in the housing portion of the spool valve regardless of weather the solenoid portion is in a non-operating state or in an operating state.

2. The solenoid valve according to claim 1, wherein the introduction hole of the spool valve has an opening at the bottom face of the housing portion.

3. The solenoid valve according to claim 2, wherein the bottom face of the housing portion is formed into a tapered shape such that a depth of the bottom face in a direction of the central axis becomes gradually larger toward a center portion of the bottom face.

4. The solenoid valve according to claim 1, wherein the bottom face of the housing portion is formed into a tapered shape such that a depth of the bottom face in a direction of the central axis becomes gradually larger toward a center portion of the bottom face.

5. The solenoid valve according to claim 1, wherein a recessed portion in which foreign matter mixed in the hydraulic fluid is retained is formed in an outer peripheral face of the piston member.

6. The solenoid valve according to claim 2, wherein a recessed portion in which foreign matter mixed in the hydraulic fluid is retained is formed in an outer peripheral face of the piston member.

7. The solenoid valve according to claim 3, wherein a recessed portion in which foreign matter mixed in the hydraulic fluid is retained is formed in an outer peripheral face of the piston member.

8. The solenoid valve according to claim 1, wherein electroless plating is performed on an area of the spool valve, the area including an inner face of the housing portion.

9. The solenoid valve according to claim 2, wherein electroless plating is performed on an area of the spool valve, the area including an inner face of the housing portion.

10. The solenoid valve according to claim 3, wherein electroless plating is performed on an area of the spool valve, the area including an inner face of the housing portion.

11. The solenoid valve according to claim 5, wherein electroless plating is performed on an area of the spool valve, the area including an inner face of the housing portion.

12. The solenoid valve according to claim 1, wherein the introduction hole extends in a direction oblique to a radial direction, which is perpendicular to the central axis of the spool valve.

13. The solenoid valve according to claim 1, wherein:
   the bottom face of the housing portion includes a tapered shape portion, and
   the introduction hole has a first opening that is formed on an outer surface of housing portion and a second opening that is formed on the tapered shape portion of the bottom face, the introduction hole extending in a direction substantially perpendicular to a direction in which the tapered shape portion extends.

14. A solenoid valve, comprising:

a tubular sleeve that has a supply port to which hydraulic fluid is supplied and an output port that outputs the hydraulic fluid;

a spool valve that is housed in a valve hole formed in the sleeve so as to be movable in an axial direction of the solenoid valve, and that changes a flow passage area between the supply port and the output port by moving in the axial direction;

a solenoid portion that operates upon reception of a supply of exciting current to push the spool valve toward one axial side; and an elastic member that urges the spool valve toward the solenoid portion, wherein a housing portion that is a bottomed hole is formed in an end portion of the spool valve so as to extend along a central axis of the spool valve, the end portion being on an opposite side of the spool valve from the solenoid portion, and a columnar piston member is slidably housed in the housing portion, the spool valve has an introduction hole through which a pressure of the hydraulic fluid output from the output port is introduced into a space between a bottom face of the housing portion and one end face of the piston member, the introduction hole is located at an opposite side of the output port with respect to the central axis of the spool valve, an opening in an end portion of the sleeve, the end portion being on an opposite side of the sleeve from the solenoid portion, is closed by a plug, the plug has a protrusion that protrudes toward the spool valve and that is formed at a center portion of the plug, and a distal end face of the protrusion faces the other end face of the piston member, and the distal end face of the protrusion of the plug is located in the housing portion of the spool valve regardless of whether the solenoid portion is in a non-operating state or in an operating state.

15. The solenoid valve according to claim 14, wherein:

the bottom face of the housing portion includes a tapered shape portion, and the introduction hole has a first opening that is formed on an outer surface of housing portion and a second opening that is formed on the tapered shape portion of the bottom face, the introduction hole extending in a direction substantially perpendicular to a direction in which the tapered shape portion extends.

* * * * *